United States Patent [19]
Bronne et al.

[11] 3,729,806
[45] May 1, 1973

[54] METHOD FOR TUBE REMOVAL

[75] Inventors: William B. Bronne; Harley E. Linthicum, both of Springfield, Ohio

[73] Assignee: Carrier Corporation, Syracuse, N.Y.

[22] Filed: July 31, 1970

[21] Appl. No.: 64,932

Related U.S. Application Data

[62] Division of Ser. No. 757,963, Sept. 6, 1968, Pat. No. 3,628,246.

[52] U.S. Cl. ........................................29/427, 225/2
[51] Int. Cl. ................................................B23p 19/02
[58] Field of Search....................29/427, 282, 157.4; 30/92.5, 168; 225/2, 96

[56] References Cited

UNITED STATES PATENTS

| | | | |
|---|---|---|---|
| 408,162 | 7/1889 | Condon | 30/92.5 |
| 1,276,458 | 8/1918 | Wagner | 30/92.5 |
| 1,719,449 | 7/1929 | Rauko | 30/92.5 X |
| 2,411,246 | 11/1946 | Clapper | 29/157.4 |
| 2,983,042 | 3/1961 | Franz et al | 30/92.5 |
| 3,176,384 | 4/1965 | Johnson | 29/427 UX |

FOREIGN PATENTS OR APPLICATIONS

| | | | |
|---|---|---|---|
| 767,372 | 6/1952 | Germany | 30/92.5 |
| 566,443 | 12/1944 | Great Britain | 30/92.5 |

*Primary Examiner*—Charlie T. Moon
*Attorney*—Herman Seid et al.

[57] ABSTRACT

A method and apparatus for relieving the hoop stresses securing a tube in a tube sheet to allow removal of the tube therefrom, the hoop stresses being relieved by removing material from the tube to form two axial slots having a radial depth less than the tube wall thickness and depressing the portion of the tube between the slots to break the portion loose from the remainder of the tube to relieve the hoop stresses therein.

1 Claim, 10 Drawing Figures

Patented May 1, 1973

INVENTOR.
WILLIAM B. BRONNE
BY HARLEY E. LINTHICUM

James E Schardt

ATTORNEY

METHOD FOR TUBE REMOVAL

This is a division of application Ser. No. 757,963, filed Sept. 6, 1968, now U.S. Pat. No. 3,628,246.

BACKGROUND OF THE INVENTION

In many heat exchanger installations such as tube-in-shell heat exchangers and boilers employing tubes therein, it is often necessary to remove tubes from the tube sheet in which they are mounted. This may be necessary for many reasons such as leaks in the tube or excessive scale formations therein.

Ordinarily the tubes are expanded into engagement with the tube sheets and are securely held therein by the hoop stresses created by the expanding process. In order to remove the tube from the tube sheets, it is necessary to relieve the hoop stresses in the tube and tube sheet. This may be accomplished by removing an axial strip of the tube wall. However, this strip must be carefully removed to prevent damage to the tube sheet as any damage thereto could result in a defective seal between the tube sheet and the replacement tube.

The present invention discloses a method and apparatus for quickly and efficiently removing an axial portion of the tube without contacting the tube sheet, thereby preventing any damage to the tube sheet.

SUMMARY OF THE INVENTION

This invention relates to a method and apparatus for relieving the hoop stresses in tubes that are expanded into engagement with a tube sheet by cutting two parallel slots in the tube wall the length of the expanded section of the tube, the slots being displaced from each other a predetermined distance and being of a depth less than the tube wall thickness to prevent damage to the tube sheet surrounding the tube. By exerting a radially inward force on the outside of the portion of the tube between the slots, the portion or leaf of metal may be easily torn from the remainder of the tube to relieve the hoop stresses therein. Once the hoop stresses have been relieved, the tube may be axially removed from the tube sheet by a suitable tube puller or a tube driver tool.

BRIEF DESCRIPTION OF THE DRAWINGS

FIG. 3 is an enlarged perspective view of the cutter utilized with tools of FIGS. 1 and 2;

FIG. 4 is an enlarged perspective view of the wear shoe utilized with tools of FIGS. 1 and 2;

FIG. 5 is a partial perspective view of the tool holder of FIG. 1;

FIG. 6 is an end view of a tube having two slots formed therein by the tools of FIGS. 1 or 2;

FIG. 7 is a sectional view of a leaf depressing tool for use with the tool of FIG. 1;

Fig. 8 is an end view of the tool of FIG. 7;

FIG. 9 is an end view of a tube having a portion thereof between the slots depressed; and FIG. 10 is a view taken along lines X—X of FIG. 9.

DESCRIPTION OF THE PREFERRED EMBODIMENT

Figure 1:
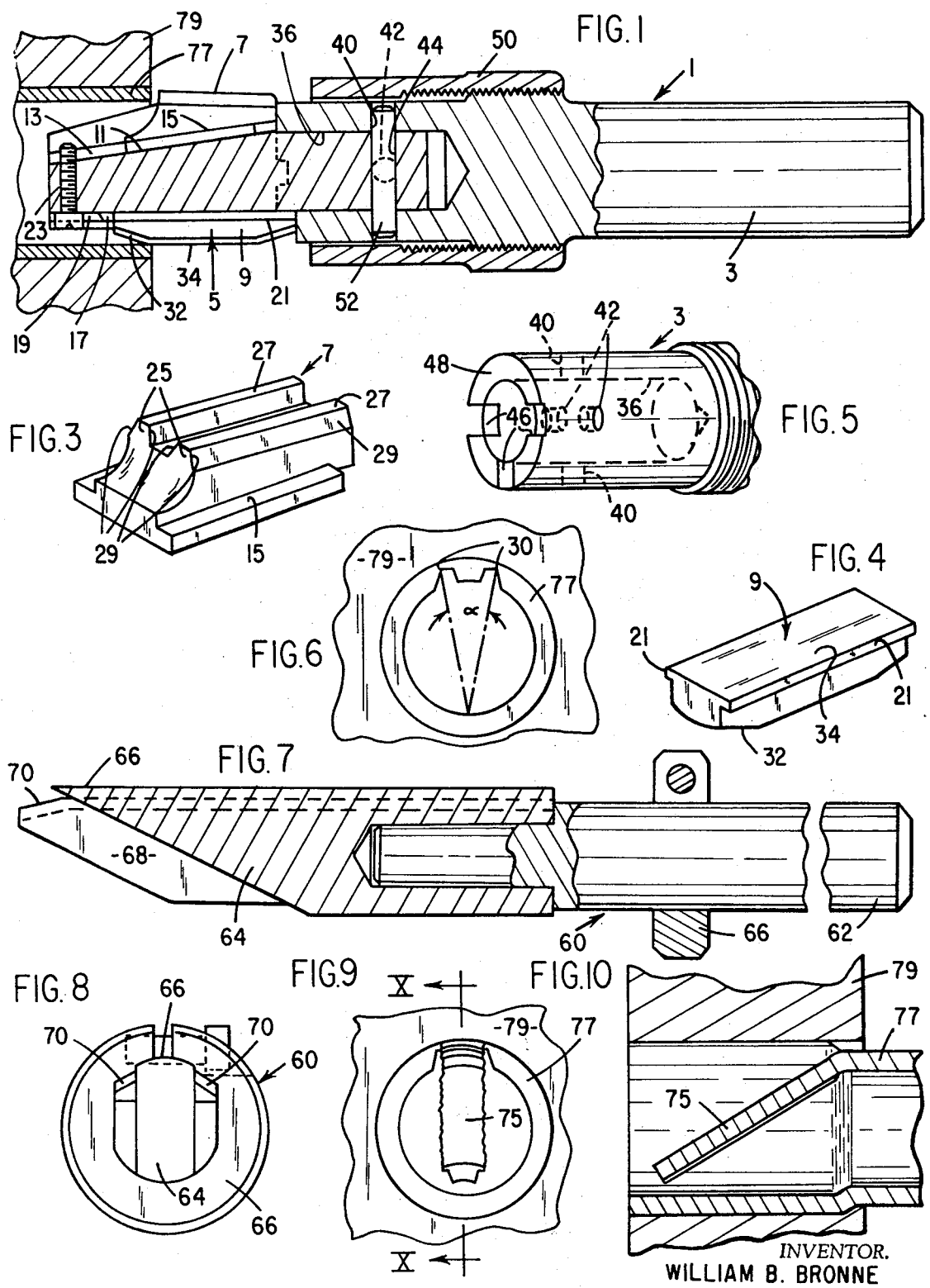
FIG. 1 is a partial sectional view of the stress relieving tool of the present invention disposed in a tube to be removed from a tube sheet.

Referring to FIG. 1 of the drawings, there is illustrated a hoop stress relieving tool 1 which includes a shank portion 3, a cutter head 5, a cutter 7 and a wear shoe 9. The head 5 is provided with an angled slot 11 having tracks 13 for sliding engagement with flanges 15 or cutter 7, and a slot 17 parallel to the axis of the head having tracks 19 for sliding engagement with flanges 21 on wear shoe 9. A suitable stop such as a screw 23 is provided in the head to prevent cutter 7 and wear shoe 9 from sliding out of their respective slots. As can be seen from the drawing, the slot and tracks for cutter 7 are disposed at an angle from the axial centerline of the tool so that displacement of the cutter to the left as viewed in FIG. 1 displaces the cutter radially inward for reasons to be hereinafter explained and the slot and tracks for wear shoe 9 are disposed parallel to the axial centerline for reasons to be hereinafter explained.

As can be seen in FIG. 3, the cutter 7 is provided with two parallel cutting teeth 25 having a flat top surface 27 and angled sides 29. By driving the tool of FIG. 1 into the tube to be removed, two slots are cut into the tube as illustrated in FIG. 6. The configuration of the cutter teeth is critical as the slots cut in the tube to be removed must be properly formed and spaced. It is therefore necessary that the corner edges 30 of the slots cut by the two teeth be disposed so that angle $\alpha$ included therebetween is approximately 10° to 20° as illustrated in FIG. 6. The cutter 7 must be properly sized and adjusted in the cutter head so that the slots formed in the tube wall will have a depth less than the tube wall thickness to prevent damage to the tube sheet.

As can be seen in FIG. 4, the wear shoe 9 is provided with a contoured surface 32 that presents to the interior surface of the tube to be cut a hard smooth wear surface to reduce the axial friction load imposed when driving the tool into the tube, further, the flat surface 34 provides a hard smooth bearing surface to support the head portion 5 and associated cutter 7.

Referring to FIG. 5 of the drawings there is illustrated a perspective view of the end of shank portion 3 having a cylindrical bore 36 therein for mating engagement with shank portion 38 of head 5. Two sets of aligned holes 40 and 42 are provided 90° apart in shank 3 for alignment with passageway 44 in shank portion 38 of head 5, the passageway 44 being disposed at a 90° angle to slots 11 and 17 in head 5. A plurality of slots 46 are provided in the end face 48 of shank 3 for receiving the back portion of cutter 7 and wear shoe 9.

As can be seen from the drawing, slot 11 and tracks 13 are disposed at an angle from the axial centerline of the tool so that axial displacement of the cutter toward the shank portion of the tool moves the cutter radially outward from the center of the tool. By rotating the head 5 in relation to shank 3, the cutter can be aligned with either the unslotted portion of face 48 or with one of the slots 46.

By providing slots of different depths, the cutter may be positioned at different axial locations relative to the shank which alters the radial position of the cutter. This allows the cutter to be adjusted radially according to the thickness of the tube wall in order to slot the tube to the proper depth, further, axial positioning of the wear shoe is provided to maintain a relationship between the forward portion of the wear shoe and the cutting face of the cutter. This adjustment may be made by moving tool stop 50 clear of openings 40 and 42, removing pin 52 which is disposed in passageway 44 and one pair of holes 40 or 42, and rotating head 5 in relation to shank 3 to align cutter 7 with the desired slot 46 or the unslotted portion of face 48 and then reinserting pin 52 through passageway 44 and the holes associated therewith.

A suitable stop such as screw 23 is provided in head 5 to prevent cutter 7 and wear shoe 9 from sliding out of their respective tracks, also, said stop 23 may be removed for replacement of cutter 7 or wear shoe 9 without changing the radial size adjustment of the tool.

The angled slot in head 5, besides providing a simple and effective way to adjust the depth of cut of the tool 7, allows the cutter to slide out of engagement with the tube as the tool is being withdrawn therefrom. Further, the flat surface 34 of the wear shoe presents a smooth hard bearing surface for the head portion 5 that further reduces the friction caused by the high radial pressure on the tool within the tube. The disengagement of the cutter is extremely important as tool withdrawal would be difficult, if not impossible, with stationary cutters due to the frictional engagement of the cutter with the tube.

The tool stop 50 is provided for engagement with the tube sheet when the tool has been driven into the tube to the proper depth by any suitable means, such as a pneumatic hammer.

After the two slots are cut in the tube by the tool of FIG. 1, the portion of the tube wall between the slots must be removed in order to relieve the hoop stresses in the tube and the tube sheet. This can be accomplished by the depressing tool 60 illustrated in FIGS. 7 and 8. The tool 60 is comprised of a shank 62, a depressor head 64 and a tool stop 66 which is suitably attached to the shank 62.

The depressor head 64 has a wedge shaped portion formed therein by an upwardly extending portion 66 and a central angled slot 68. The upwardly extending portion 66 extends above the depressor head faces 70 a distance less than the wall thickness of the tube to be removed for reasons to be hereinafter explained.

To remove the portion of material between the two slots formed in the tube wall by tool 60, the end of the portion or metal strip of the tube between the two slots formed therein is displaced inward by any suitable means such as a chisel. The depressor tool 60 is then inserted into the tube with the wedge portion of the tool between the tube sheet and the strip of metal to be removed, while the head faces 70 are disposed in engagement with the inner surface of the tube on either side of the tube slots. By driving tool 60 into the tube, the strip of material between the slots is wedged radially inward, thereby causing the material to tear from the remainder of the tube at the base of the slots. Since the upwardly extending portion 66 of tool 60 extends above the depressor head faces 70 a distance less than the tube thickness, the extended portion is held out of engagement with the tube sheet to assure that the tube sheet is not damaged by tool 60.

FIGS. 9 and 10 illustrate the orientation of a strip of material 75 between the two slots after it has been torn from the remainder of a tube 77 disposed in a tube sheet 79.

Figure 2:
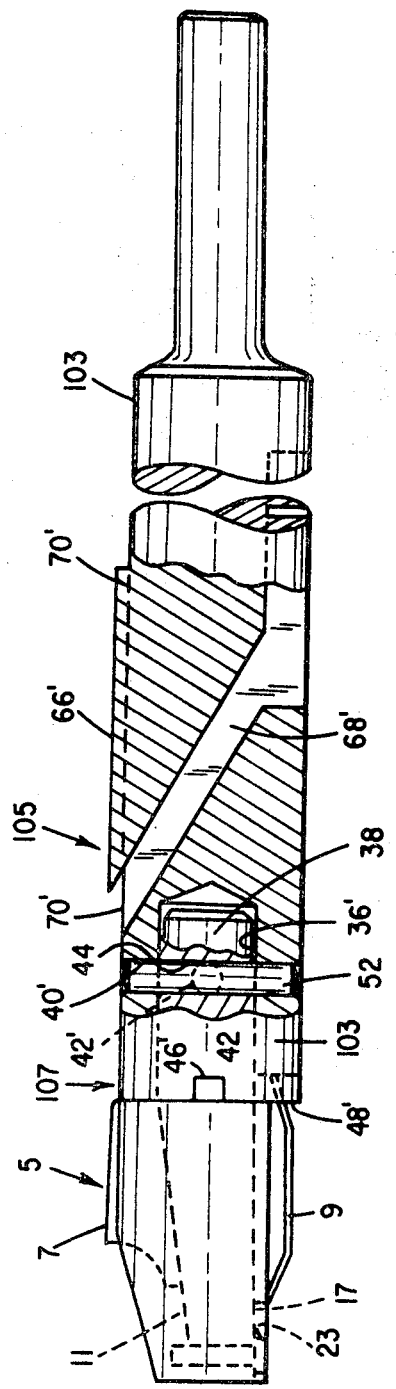
FIG. 2 is a partial sectional view of a second embodiment of the stress relieving tool of the present invention.

The tool illustrated in FIG. 2 is a second embodiment of our invention adapted to perform the tube cutting and the strip displacing steps in one operation.

The tool of FIG. 2 includes a shank portion 103, a strip depressing section 105 and an end portion 107. The end portion 107 of shank 103 is identical to that illustrated in FIG. 5 and includes a plurality of slots 46' in end face 48' and a cylindrical bore 36' adapted to receive a cutter head 5. Two sets of aligned holes 40' and 42' are provided 90° apart in shank 103 for alignment with the passageway 44 in cutter head 5. The cutter head 5, illustrated in FIG. 2, is identical to the cutter head illustrated in FIG. 1 and includes a cutter 7, a wear shoe 9, an angled slot 11 for cutter 7 and a slot 17 for wear shoe 9. A suitable stop such as screw 23 is provided to prevent the cutter 7 and wear shoe 9 from sliding out of their respective slots. The shank portion 38 of cutter head 5 is held in cylindrical bore 36' of shank 103 by a suitable pin 52. The strip depressing section 105 has a wedge shaped portion formed therein by an upwardly extending portion 66' and a central angled slot 68'. The upwardly extending portion 66' extends above the depressor head face 70' a distance less than the wall thickness of the tube to be removed to prevent contact of portion 66' with the tube sheet for reasons explained heretofore in the description of the depressing tool 60 illustrated in FIGS. 7 and 8.

The tool of FIg. 2 is driven into the tube to be removed by simple means such as a pneumatic hammer. The cutter 7 cuts two parallel slots in the tube as illustrated in FIG. 6. Further axial movement of the tool causes the wedge shaped portion of the strip depressing section 105 to contact the strip between the two slots and wedge the strip of material between the slots radially inward to tear the material from the remainder of the tube at the base of the slots.

While we have described a preferred embodiment of the invention, it will be understood the invention is not limited thereto since it may be otherwise embodied within the scope of the following claims.

We claim:

1. The method for removing a tube from a tube sheet including the steps of:

forming a pair of axially extending slots in the inner surface of the portion of the tube wall within the tube sheet, the slots being spaced apart circumferentially so as to include an angle of approximately 10° – 20° and having a depth less than the thickness of the tube side wall;

exerting an outward supporting force on the areas of the tube at the outer sides of the slots while breaking the portion of the tube side wall intermediate the slots from the tube; and displacing the tube axially to disengage the tube from the tube sheet.

* * * * *

UNITED STATES PATENT OFFICE
CERTIFICATE OF CORRECTION

Patent No. 3,729,806     Dated May 1, 1973

Inventor(s) WILLIAM B. BRONNE ET AL

It is certified that error appears in the above-identified patent and that said Letters Patent are hereby corrected as shown below:

Column 2, line 9, "or" should read --on--

Signed and sealed this 17th day of December 1974.

(SEAL)
Attest:

McCOY M. GIBSON JR.
Attesting Officer

C. MARSHALL DANN
Commissioner of Patents